United States Patent [19]

Gibson et al.

[11] 3,885,595

[45] May 27, 1975

[54] CONDUIT FOR CRYOGENIC FLUID TRANSPORTATION

[75] Inventors: Clarence John Gibson; Kenneth Kimble, both of El Cajon, Calif.

[73] Assignee: Kaiser Aerospace & Electronics Corp., Oakland, Calif.

[22] Filed: Jan. 28, 1974

[21] Appl. No.: 437,250

[52] U.S. Cl. .............. 138/155; 285/47; 285/DIG. 5
[51] Int. Cl. ......................... F16l 9/22; F16l 51/00
[58] Field of Search .......... 138/155, 157, 117, 102, 138/100; 285/137 R, DIG. 5, 47

[56] References Cited
UNITED STATES PATENTS

| | | | |
|---|---|---|---|
| 2,488,245 | 11/1949 | Smith | 285/347 |
| 3,068,026 | 12/1962 | McKamey | 285/47 |
| 3,488,067 | 1/1970 | Sommer | 285/47 X |
| 3,705,734 | 12/1972 | Rajakovics | 285/47 |
| 3,725,565 | 4/1973 | Schmidt | 285/DIG. 5 |

FOREIGN PATENTS OR APPLICATIONS

| | | | |
|---|---|---|---|
| 211,397 | 10/1955 | Australia | 285/DIG. 5 |
| 699,586 | 12/1964 | United Kingdom | 285/DIG. 5 |

OTHER PUBLICATIONS
Advances in Cryogenic Engineering, Vol. 7, S. E. Logan, 7-1955, pp. 556–561.

Primary Examiner—Henry K. Artis
Assistant Examiner—James E. Bryant, III
Attorney, Agent, or Firm—Bruno J. Verbeck

[57] ABSTRACT

A conduit section combinable in end-to-end relationship with a plurality of similar conduit sections to form a conduit for carrying cryogenic fluids. The end portions of each such conduit section are telescopable into and connectable to end portions of like conduit sections; each section has an inner pipe portion and a concentric outer pipe portion with thermal insulation therebetween; one end portion is frusto-conical, and the opposite portion is a female type adapted to receive said frusto-conical end in close fitting relationship. The said opposite end of each conduit section has a motion compensator secured thereto, the motion compensator being exposed only to external pressure when the conduit sections are connected together as by welding, and providing a gas and liquid cryogen seal while elastically compensating for relative motion between the outer and inner pipe portions due to temperature differences between the pipe portions.

5 Claims, 6 Drawing Figures

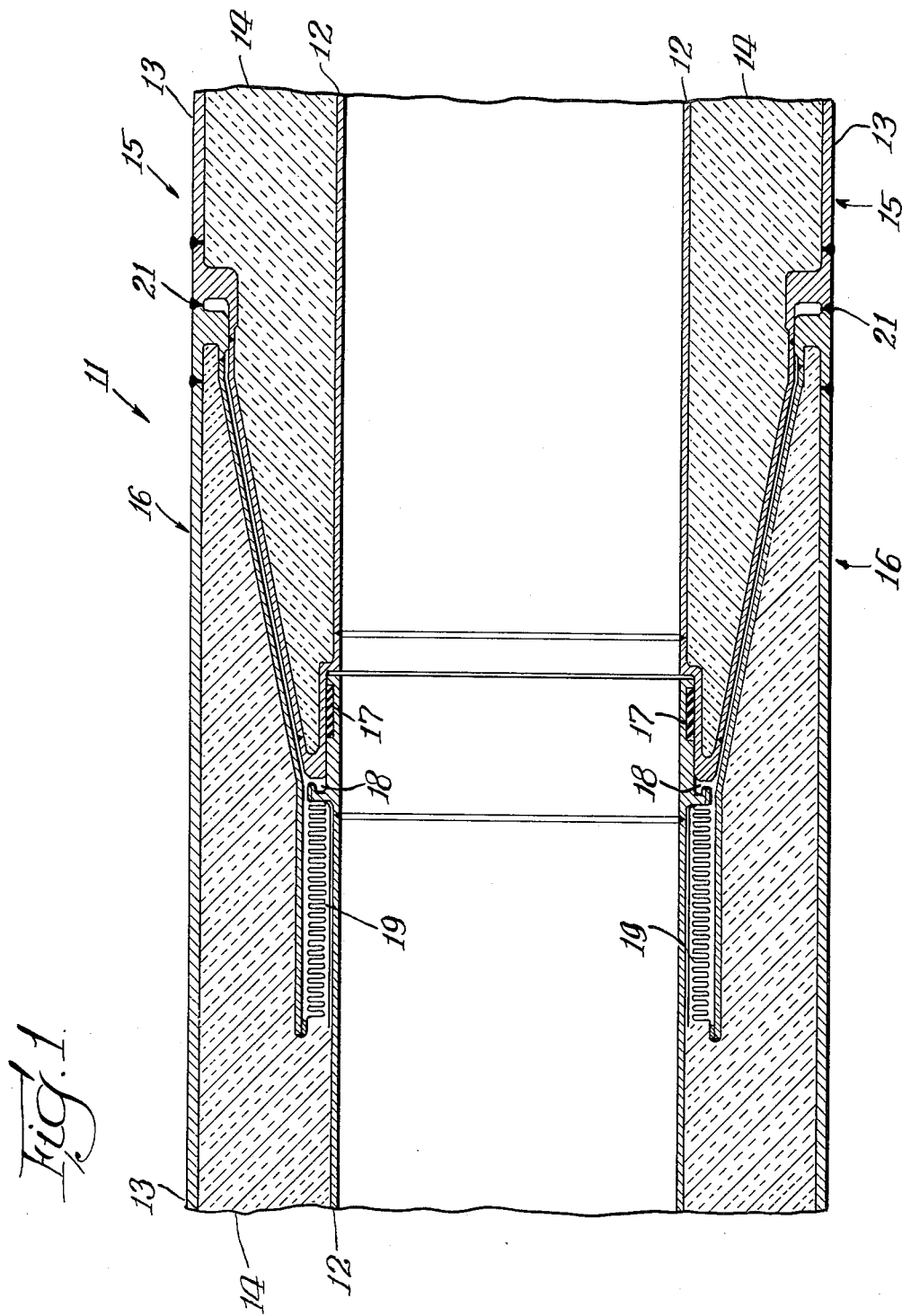

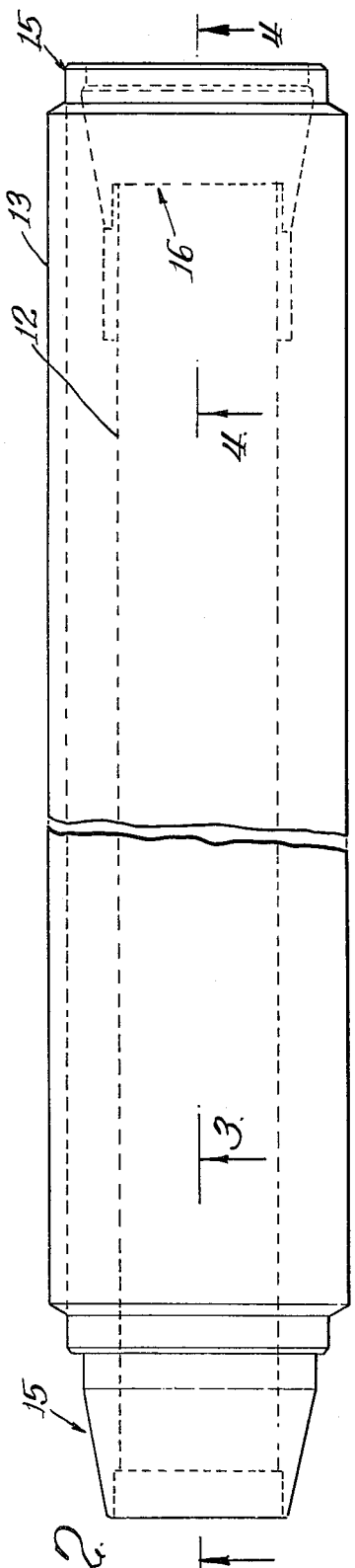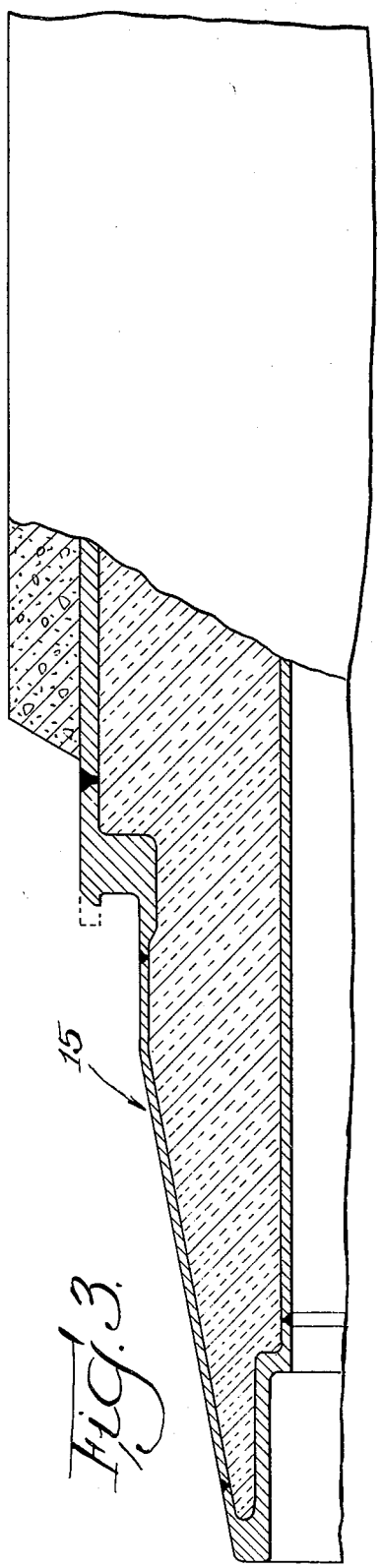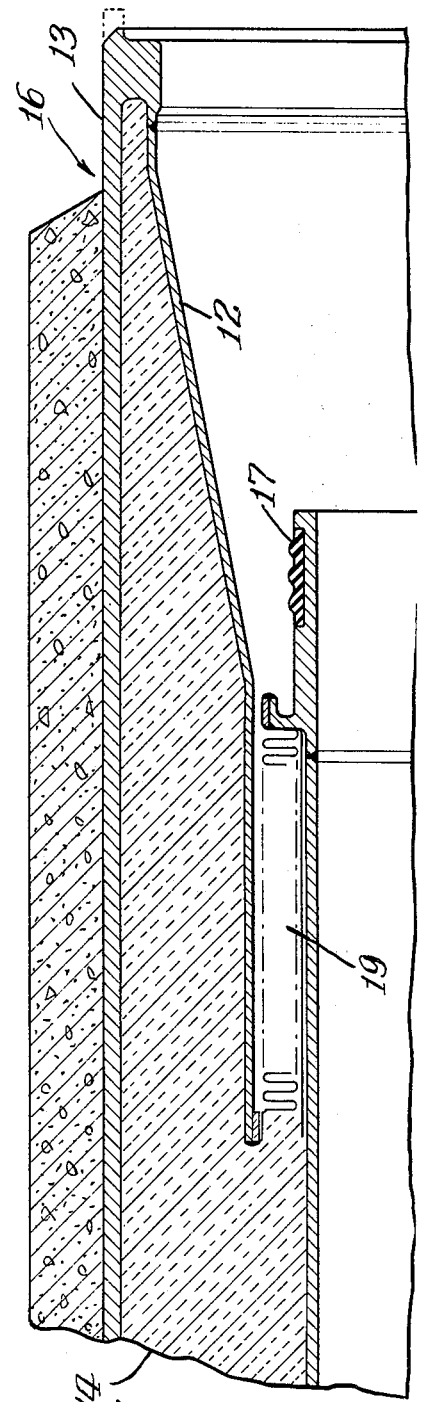

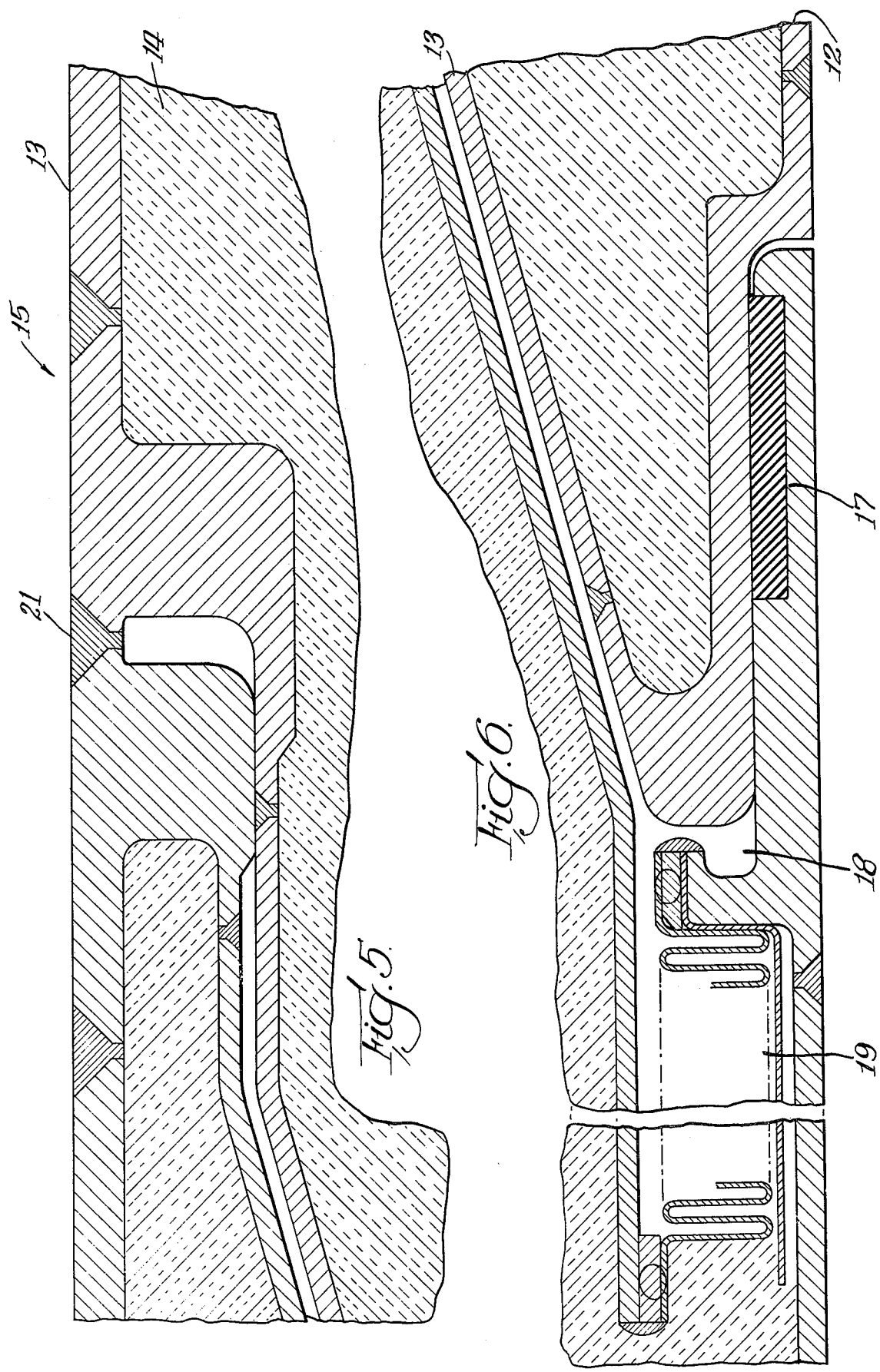

CONDUIT FOR CRYOGENIC FLUID TRANSPORTATION

BACKGROUND OF THE INVENTION

FIELD OF THE INVENTION

This invention relates to a conduit construction including pipe and coupling for transporting cryogens. The invention is directed especially to a low heat input cryogenic piping construction comprising conduits formed of a concentric inner fluid carrying pipe and an outer pipe with insulation therebetween, and a coupling for connecting the ends of sections of the conduits.

Cryogenic piping systems in use currently for liquified natural gas utilize stainless steel or nickel alloy pipe which is field or factory insulated using foam glass, polyurethane foam, or similar low density material. These materials are covered with a vapor barrier such as glass-reinforced epoxy resin. Use of such piping systems requires field welding of the stainless steel or nickel alloy piping, and field insulation over the weld joint. Additionally, the contraction of the stainless steel, or nickel alloy piping requires expansion-contraction joints to be installed at predetermined locations in the piping system. Such piping systems have been used at various places for transferring liquidifed natural gas (LNG) between ground storage containers and ocean going vessels, as well as for discharge from the vessell to shore containers, the piping being conventionally located on a pier or trestle above the water. Piping currently used is not suitable for underwater installation due to inherent problems with insulation protection, structural handling and field coupling, to mention a few. It has become apparent to me that new and unique concepts, especially for submarine piping, had to be developed, and the present invention is one resultant of my efforts to that end. The present invention as further described in full detail hereinafter includes combinations of characterizing features such as a frusto-conical bayonet arrangement for coupling sections of pipe, and an integrated thermal motion compensator (expansion-contraction bellows).

SUMMARY OF THE INVENTION

The invention provides a unique low heat input piping construction for transportation of cryogenic fluids, e.g. liquified natural gas (LNG), liquid propane (LPG) and the like, and comprises fluid-carrying insulated piping in the form of concentric sections of pipe with insulation between the inner and outer pipe, each section of such pipe having a male end and a female end, for bayonet engagement of the male end of one section with the female end of an adjacent-like section. The adjacent sections are joined together with a fluid seal therebetween. A thermal motion compensator, comprising a bellows, is positioned within the outer pipe inside the insulation therewithin and at the female end of the pipe section to permit expansion and contraction of the cryogen-carrying pipe without breakage of the fluid seal between the outer and inner pipe. This bellows is exposed normally only to external pressure.

BRIEF DESCRIPTION OF THE DRAWINGS

FIG. 1 is a diagrammatic cross-sectional view of a cryogen-carrying piping construction of concentric sections of pipe with insulation therebetween, having the joint construction, including liquid seal and thermal motion compensator of the present invention in position, and connecting adjacent sections of pipe;

FIG. 2 is a view of a section of pipe incorporating the bayonet construction and male and female end portions used in the invention;

FIG. 3 is a view partly in section along the line 3—3 of the pipe section shown in FIG. 2 illustrating the male end of the pipe section;

FIG. 4 is a view partly in section along the line 4—4 of the pipe section shown in FIG. 2 illustrating the female end of the pipe section;

FIG. 5 is a diagrammatic cross-sectional view partly broken away of details of the weld connection between the male and female ends of adjacent pipe sections comprising the invention; and FIG. 6 is a diagrammatic cross-sectional view of further details of the joint connection between the male and female ends of adjacent pipe sections comprising this invention.

DESCRIPTION OF THE PREFERRED EMBODIMENT

Referring now to the drawings, the cryogen-carrying pipe construction 11 comprises concentric sections of pipe consisting of an inner cryogenicfluid carrying pipe 12 and an outer pipe 13 with an insulation space containing a thermal insulating material 14. A liquid seal 17 of elastic material seals the space between the pipes and prevents penetration of liquid cryogen when the male end of 15 of one pipe section is in connecting or joined relationship with the female end 16 of an adjacent pipe section.

The joint between adjacent male and female ends of the pipe sections, as best shown in FIG. 1, comprises a frusto-conical male end of a conduit 15 in telescoped relation with a conformably shaped female end of adjoining conduit 16, each conduit having inner and outer concentric pipe sections with an insulation space therebetween containing a thermal insulating material 14. A liquid seal 17 of suitable material such as fluorocarbon plastics like Teflon, flexible metal or combinations thereof, compatible with the fluid being transported, prevents penetration of liquid cryogen through the seal 17 so that only gases and vapors can seep past seal 17, which then expand, as a result of heat leakage, in the chamber 18 formed at the joint between male and female ends 15 and 16 of adjacent pipe sections and exert only external pressure on the thermal motion compensator 19.

Thermal motion compensator 19 is a metallic bellows secured to the female end 16 of the inner pipe 12, as by welding, so that the pressure of the liquid cryogenic in the inner pipe 12 is exposed to the outside of compensator 19. Pressure which is applied externally to the compensator 19 tends to stabilize the bellows against instability or squirm.

As seen from the drawing, the bayonet design comprising the male and female ends 15 and 16 of adjacent pipe lengths is frusto-conical in form, this form being especially advantageous in the manufacture and in the field assembly of such pipe sections, as well as having structural advantages over, e.g., cylinder bayonet shapes.

A further and important advantage of the present invention stems from the fact that the welds of nickel, stainless or alloy steels are made at the factory, while in the field the only welds made are carbon steel welds.

Fluid seals as used in the present invention reduce the amount of leakage of liquid into the joing or coupling when assembled as shown in FIG. 1, for example. To properly function as a low heat path to the cryogenic fluid in the inner pipe 12, the bayonet coupling of this invention has a static seal 21 at the outer ambient pipe 13 which for submarine pipe applications is a weld which joins the pipe sections together at the coupling, as previously discussed, and the seal 17 is positioned near the inner pipe 12 to prevent liquid cryogen from penetrating past the seal.

In assembling pipe sections in the field, for example, the male end 15 of a pipe section is thrust into the female end 16 of an adjoining pipe section, and welds then made at 21, the procedure being continued sequentially with more pipe sections until the desired length of combined pipe sections is achieved.

It is preferred, though not essential, that the outer pipe 13 be of carbon steel and that the compensator 19 comprise a stainless steel or low temperature alloy bellows in contact with the carbon steel outer pipe 13, and with stainless or low temperature alloy steel or aluminum pipe 12 to handle the expansion and contraction effect in the inner pipe 12 caused by the liquid cryogen flowing through the latter. The compensator 19 is, furthermore, as previously described, in contact with and resists by means of its outer walls the higher pressure of gas leaking past liquid seal 17.

For submarine applications the outer pipe 13 is protected and coated with an anti-buoyant material such as cement as well as anticorrosion materials. Pier, trestle or underground installations require only corrosion protection of the outer pipe 13.

Insulation 14 may be of any desired material, such as pearlite, polyurethane foam, or even may consist of high vacuum with or without radiation shielding.

We claim:

1. A conduit section for use in a cryogenic fluid carrying conduit formed from a plurality of said sections, said conduit section having at its opposite ends a first end portion and a second end portion, said end portions being telescopable into and connectible to end portions of like conduit sections to thereby form a cryogenic fluid carrying conduit, said conduit section having an inner pipe portion and a concentric outer pipe portion with thermal insulation therebetween, the said first end portion being frusto-conical, and said second end portion having a motion compensator secured thereto, said motion compensator being exposed only to external pressure when said conduit sections are connected together, and providing a gas or liquid cryogen seal while elastically compensating for relative motion between said outer and inner pipe portions due to temperature differences between said portions.

2. A conduit for carrying cryogen fluids comprising a plurality of similar conduit sections connected in end to end relationships; each of such sections comprising an inner pipe and a concentric outer pipe, with thermal insulation there between, one end of each of such sections being frustoconical and telescopable into and connectable to a female type end portion of a similar conduit section; the telescoped ends of said sections having a seal there between for inhibiting liquid cryogen penetration into spaces between said telescoped ends, and a motion compensator secured to that end of each conduit section into which the said frusto-conical end of a similar conduit section is telescoped, said motion compensator being exposed only to external pressure when said sections are connected together and providing a gas and liquid seal while elastically compensating for relative motion between said outer and inner pipe portions due to temperature differences between said portions.

3. A conduit section in accordance with claim 1 wherein said outer pipe is of carbon steel and said inner pipe is of a low temperature alloy.

4. The conduit section of claim 1 wherein the said inner pipe is of a material selected from the group consisting of stainless steel, nickel steel and aluminum.

5. A conduit in accordance with claim 2 wherein the outer pipe is coated with an antibuoyant material.

* * * * *